United States Patent
Namburu (10) Patent No.: US 9,686,848 B2
(45) Date of Patent: Jun. 20, 2017

(54) PLASMA CUTTING TORCH, NOZZLE AND SHIELD CAP

(71) Applicant: LINCOLN GLOBAL, INC., City of Industry, CA (US)

(72) Inventor: Praveen K. Namburu, Charleston, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 421 days.

(21) Appl. No.: 14/495,996

(22) Filed: Sep. 25, 2014

(65) Prior Publication Data

US 2016/0095195 A1    Mar. 31, 2016

(51) Int. Cl.
   H05H 1/28    (2006.01)
   H05H 1/34    (2006.01)

(52) U.S. Cl.
   CPC ............... *H05H 1/28* (2013.01); *H05H 1/34* (2013.01); *H05H 2001/3457* (2013.01); *H05H 2001/3468* (2013.01); *H05H 2001/3478* (2013.01)

(58) Field of Classification Search
   CPC .. H05H 1/28; H05H 1/26; H05H 1/34; H05H 2001/3457; H05H 2001/3468; H05H 2001/2478
   USPC .............. 219/121.5, 121.49, 121.51, 121.52, 219/121.59, 121.48, 75
   See application file for complete search history.

(56) References Cited

U.S. PATENT DOCUMENTS

| | | | |
|---|---|---|---|
| 4,861,962 A * | 8/1989 | Sanders | B23K 10/006 219/121.5 |
| 4,967,055 A | 10/1990 | Raney et al. | |
| 5,464,962 A | 11/1995 | Luo et al. | |
| 5,601,734 A | 2/1997 | Luo et al. | |
| 5,660,743 A * | 8/1997 | Nemchinsky | H05H 1/3405 219/121.48 |
| 5,695,662 A | 12/1997 | Couch, Jr. et al. | |
| 5,747,767 A | 5/1998 | Severance et al. | |
| 5,756,959 A | 5/1998 | Freeman et al. | |
| 5,767,478 A | 6/1998 | Walters | |
| 5,841,095 A | 11/1998 | Lu et al. | |

(Continued)

FOREIGN PATENT DOCUMENTS

| | | |
|---|---|---|
| DE | 102004049445 A1 | 4/2006 |
| DE | 202006018163 U1 | 3/2007 |

(Continued)

OTHER PUBLICATIONS

International Application No. PCT/IB2015/001412, International Search Report & Written Opinion, 12 pages, Feb. 9, 2016.

(Continued)

*Primary Examiner* — Mark Paschall
(74) *Attorney, Agent, or Firm* — Perkins Coie, LLP (57) ABSTRACT

A plasma torch assembly, and components thereof, is provided with optimized attributes to allow for improved torch durability add versatility. A torch nozzle is provided having a novel design, including exterior cooling channels running along a length of the nozzle. An improved inner retaining cap assembly is provided which imparts a swirl on shield gas flow. Additionally, a shield cap and outer retainer have optimized geometries to allow the torch to be made narrower to facilitate the cutting of complex 3-D shapes and bevel cuts not attainable with known mechanized plasma torches.

20 Claims, 8 Drawing Sheets

(56) References Cited

U.S. PATENT DOCUMENTS

| | | | |
|---|---|---|---|
| 5,886,315 A | 3/1999 | Lu et al. | |
| 5,977,510 A | 11/1999 | Lindsay et al. | |
| 5,994,663 A | 11/1999 | Lu | |
| 6,020,572 A | 2/2000 | Marner et al. | |
| 6,066,827 A | 5/2000 | Nemchinsky | |
| 6,084,199 A | 7/2000 | Lindsay et al. | |
| 6,114,650 A | 9/2000 | Marner et al. | |
| 6,130,399 A | 10/2000 | Lu et al. | |
| 6,163,008 A * | 12/2000 | Roberts | H05H 1/34 219/121.48 |
| 6,207,923 B1 | 3/2001 | Lindsay et al. | |
| 6,403,915 B1 | 6/2002 | Cook et al. | |
| 6,423,922 B1 | 7/2002 | Nemchinsky et al. | |
| 6,424,082 B1 | 7/2002 | Hackett et al. | |
| 6,452,130 B1 | 9/2002 | Qian et al. | |
| 6,483,070 B1 | 11/2002 | Diehl et al. | |
| 6,614,001 B2 | 9/2003 | Hackett et al. | |
| 6,686,559 B1 | 2/2004 | Walters et al. | |
| 6,841,754 B2 | 1/2005 | Cook et al. | |
| 6,946,617 B2 | 9/2005 | Brandt et al. | |
| 6,969,819 B1 | 11/2005 | Griffin et al. | |
| 7,019,255 B2 | 3/2006 | Brandt et al. | |
| 7,081,597 B2 | 7/2006 | Severance, Jr. et al. | |
| 7,193,174 B2 | 3/2007 | Brandt et al. | |
| 7,256,366 B2 | 8/2007 | Severance et al. | |
| 7,375,302 B2 | 5/2008 | Twarog et al. | |
| 7,375,303 B2 | 5/2008 | Twarog et al. | |
| 7,423,235 B2 | 9/2008 | Severance, Jr. et al. | |
| 7,435,925 B2 | 10/2008 | Griffin et al. | |
| 7,598,473 B2 | 10/2009 | Cook et al. | |
| 7,605,340 B2 | 10/2009 | Duan et al. | |
| 7,659,488 B2 | 2/2010 | Cook et al. | |
| 7,754,993 B2 | 7/2010 | Ortega et al. | |
| 7,829,816 B2 | 11/2010 | Duan et al. | |
| 7,989,727 B2 | 8/2011 | Twarog et al. | |
| 8,035,055 B2 | 10/2011 | Twarog et al. | |
| 8,089,025 B2 | 1/2012 | Sanders et al. | |
| 8,097,828 B2 | 1/2012 | Roberts et al. | |
| 8,101,882 B2 | 1/2012 | Mather et al. | |
| D654,104 S | 2/2012 | Fitzpatrick et al. | |
| 8,115,136 B2 | 2/2012 | Mather et al. | |
| 8,153,927 B2 | 4/2012 | Twarog et al. | |
| 8,212,173 B2 | 7/2012 | Liebold et al. | |
| 8,304,684 B2 | 11/2012 | Smith et al. | |
| 8,338,740 B2 | 12/2012 | Liebold et al. | |
| 8,389,887 B2 | 3/2013 | Currier et al. | |
| 8,395,077 B2 | 3/2013 | Duan et al. | |
| 8,525,069 B1 | 9/2013 | Mather et al. | |
| 8,541,712 B2 | 9/2013 | Mather et al. | |
| D692,402 S | 10/2013 | Dalton et al. | |
| 8,546,718 B2 | 10/2013 | Mather et al. | |
| 8,546,719 B2 | 10/2013 | Warren, Jr. et al. | |
| 8,581,139 B2 | 11/2013 | Severance, Jr. et al. | |
| 8,633,417 B2 | 1/2014 | Ashtekar et al. | |
| 8,698,036 B1 | 4/2014 | Kornprobst et al. | |
| 8,759,709 B2 | 6/2014 | Mather et al. | |
| 8,772,667 B2 | 7/2014 | Yang et al. | |
| 8,829,385 B2 | 9/2014 | Yang et al. | |
| 2002/0185475 A1 | 12/2002 | Horner-Richardson et al. | |
| 2004/0169018 A1 | 9/2004 | Brasseur et al. | |
| 2006/0163216 A1 | 7/2006 | Brandt et al. | |
| 2012/0012560 A1 | 1/2012 | Roberts et al. | |
| 2012/0145680 A1* | 6/2012 | Warren, Jr. | B23K 10/00 219/121.44 |
| 2013/0043224 A1 | 2/2013 | Leiteritz et al. | |
| 2013/0306607 A1 | 11/2013 | Mather et al. | |
| 2014/0021175 A1 | 1/2014 | Chen et al. | |
| 2014/0110382 A1 | 4/2014 | Beliveau et al. | |
| 2015/0351214 A1* | 12/2015 | Patel | H05H 1/28 219/121.49 |
| 2016/0050740 A1* | 2/2016 | Zhang | B23K 10/02 219/121.5 |

FOREIGN PATENT DOCUMENTS

| | | |
|---|---|---|
| EP | 0729805 A1 | 4/1996 |
| EP | 0790756 A2 | 8/1997 |
| WO | 9953734 A1 | 10/1999 |
| WO | 0028794 A1 | 5/2000 |
| WO | 2006113737 A2 | 10/2006 |
| WO | 2008101226 A1 | 2/2008 |
| WO | 2010111695 A1 | 9/2010 |
| WO | 2012118826 A1 | 9/2012 |
| WO | 2014187438 A1 | 11/2014 |

OTHER PUBLICATIONS

International Application No. PCT/IB2015/000683 International Search Report & Written Opinion, 12 pages, Aug. 31, 2015.
International Application No. PCT/IB2015/000702, International Search Report & Written Opinion, 14 pages, Aug. 25, 2015.
International Application No. PCT/IB2015/000714, International Search Report & Written Opinion, 10 pages, Aug. 31, 2015.
International Application No. PCT/IB2015/001694, International Search Report & Written Opinion, 14 pages, Dec. 23, 2015.
U.S. Appl. No. 14/625,286, filed Feb. 18, 2015, Nozzle Throat for Thermal Processing and Torch Equipment.
U.S. Appl. No. 14/465,752, filed Aug. 212, 2014, Rotatable Plasma Cutting Torch Assembly with Short Connections.
U.S. Appl. No. 14/465,724, filed Aug. 21, 2014, Rotatable Plasma Cutting Torch Assembly with Short Connections.
U.S. Appl. No. 14/281,848, filed May 19, 2014, Improved Air Cooled Plasma Torch and Components Thereof.
U.S. Appl. No. 14/465,765, filed Aug. 21, 2014, Multi-Component Electrode for a Plasma Cutting Torch and Torch Including the Same.
U.S. Appl. No. 14/281,818, filed May 19, 2014, Air Cooled Plasma Torch and Components Thereof.
U.S. Appl. No. 14/281,861, filed May 19, 2014, Air Cooled Plasma Torch and Components Thereof.
U.S. Appl. No. 14/495,971, filed Sep. 25, 2014, Plasma Cutting Torch, Nozzle and Shield Cap.
U.S. Appl. No. 14/729,900, filed Jun. 3, 2015, Multi-Component Electrode for a Plasma Cutting Torch and Torch Including the Same.
U.S. Appl. No. 13/546,639, filed Jul. 11, 2012, Electrode for a Plasma Arc Cutting Torch.

* cited by examiner

PLASMA CUTTING TORCH, NOZZLE AND SHIELD CAP

BACKGROUND OF THE INVENTION

Field of the Invention

Systems and methods of the present invention relate to plasma cutting, and more specifically to arc plasma cutting using a torch assembly having a novel nozzle and shielding configuration.

Description of the Related Art

The use of plasma cutting systems in various industries has grown, and as a result there is an increasing need to increase the durability and longevity of torches and their components. This is particularly true with regarding to some internal torch parts, such as the nozzle, and some external torch parts, such as the shield cap. As is generally known, plasma cutting involves the use of high current plasma jet which generates a large amount of heat during cutting and can generate spatter during piercing or arc starting. This high heat and spatter adversely affects the operational life of components in the torch, which then require replacement—causing downtime. Accordingly, improvements are needed which reduce this downtime and increase the operational life of torch components.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include equipment and methods related to plasma cutting torches and components thereof which are improved over known torches. Embodiments include at least improved torch nozzle geometry and configurations, improved torch geometry, torch profile and shield cap geometry, and improved inner retaining cap assembly configurations. Exemplary torches as described herein have improved durability, precision and operation over known torches, especially in cutting complex 3-D shapes and bevel cuts. Exemplary nozzles include exterior cooling channels and improved configuration, exemplary torches and torch shield caps have improved narrow geometries and profiles, and exemplary inner retainer cap assemblies have improved performance and provide for overall improved torch geometries.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is noted that for purposes of the following discussion, the system will be discussed as a liquid cooled, mechanized plasma arc cutting system. However, exemplary embodiments are not limited to being used in such arc cutting systems, and embodiments can be used in hand held cutting systems as well as air cooled systems. Thus, the following discussions are intended to be exemplary and informative. Further, discussions below will use terminology such as "distal" and "downstream". In the context of this application it is understood that these terms mean closer to the end of the torch from which the plasma is emitted. For example, the distal end of the torch is the end of the torch from which the plasma jet is emitted to perform cutting. Further, is something is "downstream" of another component, it is closer to the distal end of the torch. Similarly, the use of the term "upstream" will generally indicate that something is further away from the distal end of the torch.

Because the manufacture, assembly and use of arc cutting torches is generally known to those of skill in the art, the details of their assembly and components thereof will not be set forth herein.

Figure 1:
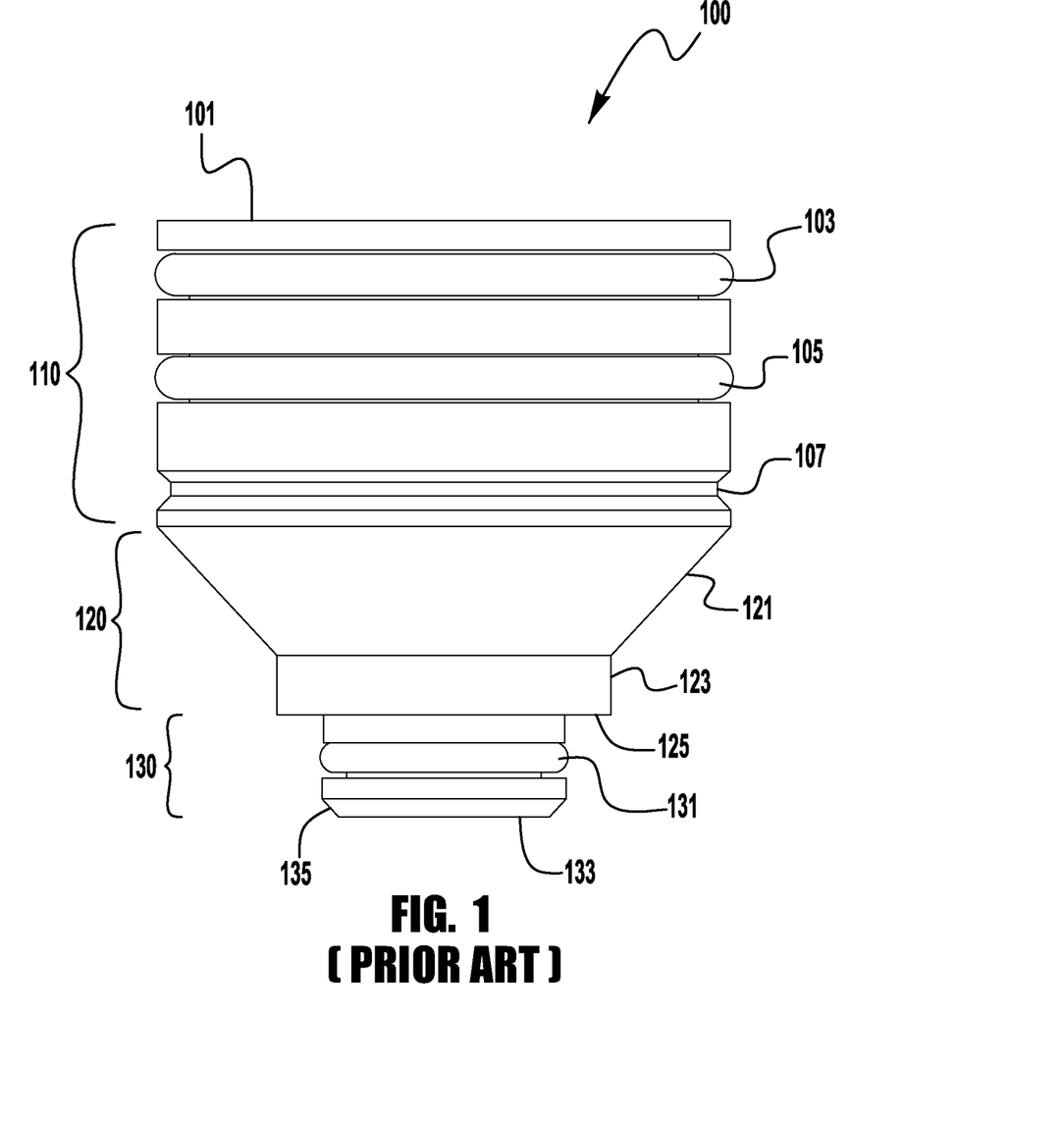
FIG. 1 is a diagrammatical representation of a known nozzle configuration.

Turning now to FIG. 1, a known cutting torch nozzle 100 configuration is shown. While nozzle configurations can vary, the nozzle 100 depicted is representative of many known configurations. As generally known, the nozzle aids in focusing and directing the plasma jet from the torch electrode to the workpiece. The nozzle 100 has a cavity and throat (not shown) which directs the plasma jet to the exit of the torch and to the workpiece. Because the construction and use of the cavity and throat are known, they need not be discussed herein.

As shown, the nozzle 100 has an upstream portion 111 with an upstream end and in which a cavity opening is made so that the electrode and gas swirl ring can be inserted. The upstream portion is typically a cylindrical portion having a diameter which is the maximum outside diameter of the nozzle. In the embodiment shown, the outer surface of the upstream portion 110 has a first and second o-ring groove 103/105 (o-rings are shown in the grooves 103/105). Downstream of the o-ring grooves 103/1-5 is a nozzle removal groove 107 which provides a groove for which a nozzle removal tool can be used to remove the nozzle from a torch. Downstream of the upstream portion 110 is a transition portion 120. The transition portion 120 changes the outer diameter of the nozzle 100 from the large upstream portion to a smaller diameter due to conical shape of the torch end. The transition portion has an angled surface 121, which is has a truncated cone shape and transitions the nozzle 100 from the upstream portion diameter to a smaller diameter in for the transition cylindrical portion 123. The transition cylindrical portion 123 is used to create a shoulder portion 125 having a surface which is perpendicular to the centerline of the nozzle 100. The shoulder portion 125 is used to provide a seating surface for the nozzle retaining cap—used to hold the nozzle within the torch. Downstream of the transition portion is the distal portion 130 having a generally cylindrical shape and the smallest outer diameter of the nozzle 100. The distal portion 130 also has an o-ring groove 131 (o-ring shown within the groove) which is sealed against the nozzle retaining cap, and ends at the distal end 133 of the nozzle. The distal end 133 of the nozzle 100 has the exit orifice of the nozzle throat (not shown) from which the plasma jet is emitted and directed to the workpiece. The distal end 133 of the nozzle 100 also has a chamfered edge 135 which is the distal most retaining cap seating surface. That is, the edge 135 is used to aid in seating the nozzle 100 within the retaining cap for the nozzle 100. Thus, the distal end 133 of the nozzle 100 is generally flush with the distal end surface of the retaining cap, when the torch is assembled. In additional to the plasma jet, a swirl gas can be passed through the nozzle 100 and exit from the orifice in the distal end.

While the shown configuration operates acceptably, it is desirable to increase the operational life of the nozzle. Because of their proximity to the plasma jet, the nozzle sees very high heat during torch operation, and while the nozzle is cooled by both the swirl and shield gas this high heat can shorten the operational life of the nozzle. Therefore, improvements are needed to increase the durability of nozzles.

Figure 2:
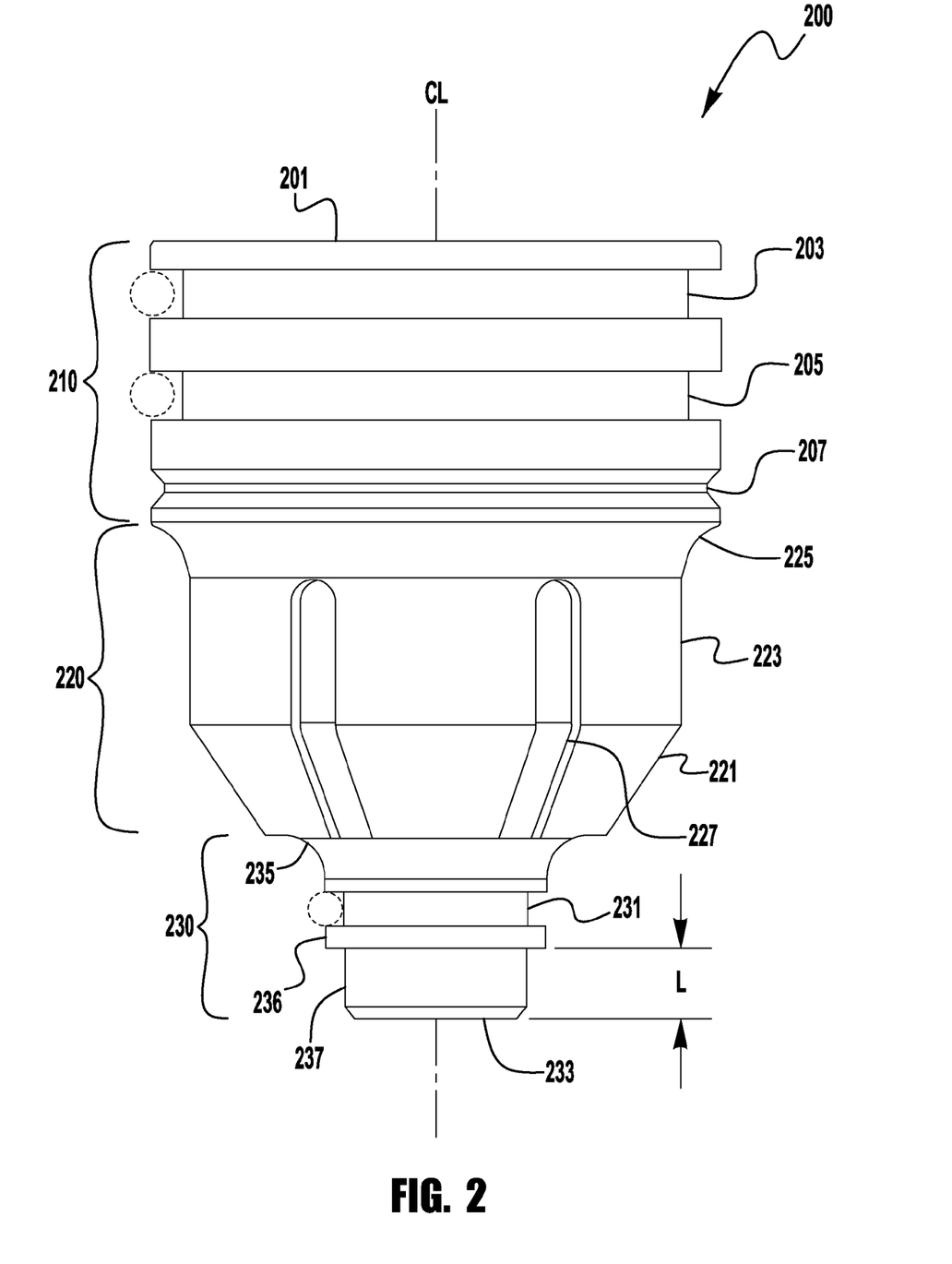
FIG. 2 is a diagrammatical representation of an exemplary nozzle of the present invention.

An exemplary improved nozzle of the present invention is shown in FIG. 2. While the nozzle 200 has some broad similarities to the known nozzle 100 configuration, there are a number of enhancements which improve the performance of the nozzle 200. They are discussed below.

The nozzle 200 has an upstream portion 210 which has the upstream end 201 of the nozzle, at least two o-ring grooves 203/205 and a nozzle removal groove 207. The upstream portion has a general cylindrical outer shape and has the largest outer diameter of the nozzle 200. Downstream of the upstream portion 210 is the transition portion 220. Directly adjacent to the upstream portion 210 is a curved transition portion 225 which uses a curved transition from the outside diameter of the upstream portion 210 to a cylindrical portion 223, which has a maximum outside diameter which is smaller than the max. outside diameter of the upstream portion 210. The curved transition portion 225 can have a arcuate shape or can have a circular shape (i.e., having a single radius of curvature). This allows for a smooth flow transition between portions on the nozzle 200. The cylindrical portion 223 has a plurality of cooling channels 227 distributed radially around the perimeter of the cylindrical portion 223. The cooling channels 227 can begin in the cylindrical portion 223, at the transition from the curved transition portion 225 to the cylindrical portion 223, or in the curved transition portion 225. Additionally, in some exemplary embodiments, the cooling channels 227 can just be located on the angled transition portion 221. For example, nozzles for low amperage applications (i.e., below 150 amps) the grooves 227 can just be located on the portion 221. The grooves 227 are generally recesses in the outer surface of the transition portion 220 of the nozzle 200.

The cooling channels 227 increase the overall amount of surface area of the transition portion 200 exposed to the coolant flow as well as aid in directing the flow in a desired path along the nozzle 200. In exemplary embodiments, the number of cooling channels is in the range of 5 to 12, and are distributed evenly around the circumference of the nozzle 200. In the embodiment shown in FIG. 2, the cooling channels 227 run in a line co-planar with the centerline CL of the nozzle 200 and its throat (not shown). The centerline CL passes through the center of a nozzle cavity (discussed further below). Also, it is noted that in the FIG. 2 a relative flow direction would extend from the top of the figure to the bottom, which is generally the flow of gas through the cavity. However, in other exemplary embodiments, the channels 227 can be angled to impart a swirl into the flow of cooling medium (e.g., water) passing along the length of the nozzle 200 in the area of the cooling channels. The shape of the channels 227 can be optimized for the desired flow pattern and cooling to be achieved. However, in some exemplary embodiments, the channels 227 have a width which is larger than their depth. Moreover, in some exemplary embodiments all of the channels 227 have the same cross-sectional shape and flow direction, while in other embodiments a first grouping of channels can have a first cross-sectional shape (e.g., rectangular), while a second grouping of channels can have a different shape (e.g., semi-circular). Moreover, some channels can be co-planar with the centerline CL along their length, while other can be angled to impart a swirl in the coolant flow.

In the exemplary embodiment shown in FIG. 2, the nozzle 200 has six channels 227 which are distributed evenly, radially around the nozzle 200. As shown, the entire length of the channels 227 are co-planar with the with the centerline CL of the nozzle. Further, the channels have a generally rectangular cross-section, where their width is larger than their depth.

Downstream of the cylindrical portion 223 is an angled transition portion 221 which is shaped like a truncated cone and reduces the outer diameter of the nozzle 200. As shown, in exemplary embodiments of the present invention, the cooling channels 227 extend onto the angled transition portion 221 and can extend to the distal end of the angled transition portion 221, as shown. In other exemplary embodiments, the cooling channels 227 can terminate prior to the angled transition portion 221, or along the length of the angled transition 221. Further, as shown, the channels 227 in the angled transition portion 221 remain co-planar with the centerline CL of the nozzle 200 and remain in line with the portions of the channels 227 in the cylindrical portion 223. However, in other exemplary embodiments the portions of the channels 227 in the angled transition portion 221 can be angled relative to the portions of the channels 227 on the cylindrical portion 223. Further, in the embodiment shown in FIG. 2, the portions of the channels 227 in the angled transition portion 221 has the same cross-section as the portions of the channels 227 in the cylindrical portion 223. However, in other exemplary embodiments the cross-section of the channels 227 in the angled transition portion 221 is different from the portions of the channels 227 in the cylindrical portion. For example, the portions of the channels 227 in the angled portion 221 can be wider and/or shallower to aid in heat dissipating the to coolant flow out of the channels 227. In further exemplary embodiments, the cross-section of the portions of the channels 227 in the angled portion 221 can change along their length. That is, at the transition from the cylindrical portion 223 to the angled portion 221 the cross-section of the channels 227 can be consistent with that used in the portion 223. However, as the channels 227 progress towards the distal end of the angled transition portion 221 the cross-sections can vary as desired to achieve a desired performance.

As shown, downstream of the transition portion 220 is a distal portion 230 of the nozzle 200. The distal portion 230 has a curved transition portion 235 similar to the portion 225 discussed above. The curved transition portion 235 can have an arcuate or circular shape and reduces the outside diameter of the nozzle 200 to a diameter of the distal portion 230 of the nozzle 200, where the maximum outside diameter of the distal portion 230 is smaller than the smallest diameter of any of the upstream 210 and transition 220 portions. Downstream of the curved transition portion 235 is at least one o-ring groove 231. In other embodiments, more than one o-ring groove can be utilized. The o-ring groove 231 is used to secure an o-ring that seats against the retaining cap when installed. Downstream of the o-ring groove 231 is a retaining cap seat portion 236 against which a portion of the retaining cap is seated to hold the nozzle 200 in place within a torch. Downstream of the retaining cap seat portion 236 is a distal cooling portion 237, which ends at the distal end face 233 of the nozzle. The distal cooling portion 237 has a length L such that at least some of the distal cooling portion extends beyond a distal end of the nozzle retaining cap and is exposed to the shield gas flow within the torch. This allows a flow of the shield gas to contact the tip of the nozzle top aid in the cooling of the nozzle 200. This can be seen in at least FIG. 5, which shows a cross-section of an exemplary torch which includes an exemplary nozzle 200. (It is noted that a discussion of the torch is set forth below regarding FIG. 4). As shown, the distal cooling portion 237 has a length such that it extends beyond the distal end of the retaining cap 409 by a distance X. This allows at least a portion of the distal cooling portion 237 to be in the shield gas flow directed in the opening 510 between the retaining cap 409 and the shield cap 303. In exemplary embodiments of the present invention, the distance X (measured between the distal end face of the retaining cap 409 and the distal end face 233 of the nozzle 200 is in the range of 0.025 to 0.15 inches. In other embodiments, different distances can be used so long as the desired cooling can be achieved. However, the distance X should not be so long as to compromise the flow of the shield gas through the gap 510. Further, the length L of the cooling portion 237 allows for the additional cooling of the end of the nozzle via heat transfer to the retaining cap assembly. In exemplary embodiments, the length L (as measured from the distal end surface of the retaining cap seat portion 236 to the distal face 233 of the nozzle) is in the range of 5 to 15% of the overall length of the nozzle (as measured from surface 201 to surface 233). This allows for additional cooling of the nozzle tip and thus extends the life of the nozzle 200.

The above discussed characteristics of the nozzle 200, both collectively and separately, significantly improves the cooling of the nozzle 200 over known torches and improves the efficiencies of the gas flow along the nozzle 200. Thus, embodiments of the present invention provide significant operational advantages over known torches. Further, the above also allows the overall design of the torch to be optimized as further discussed below.

Figure 3:
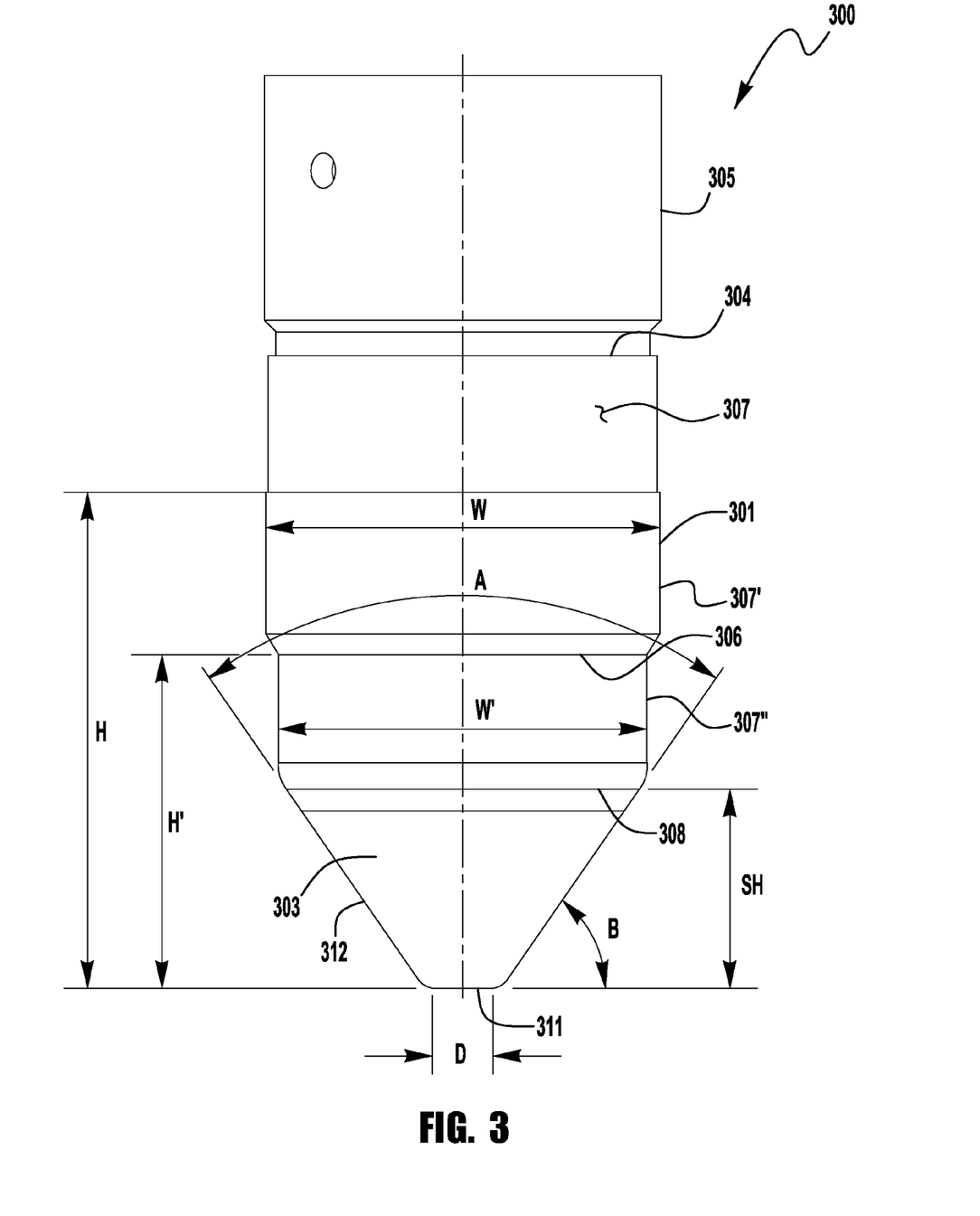
FIG. 3 is a diagrammatical representation of an exemplary torch head in accordance with an embodiment of the present invention.

Turning now to FIG. 3, an exemplary torch 300 is shown. As explained previously, the use of plasma torches in cutting operations has increased. This is especially true in mechanized and robotic systems where the torches are used to cut complex shapes. For example, torches are used to cut complex 3-D shapes or bevel cuts. However, because of the complexity of known torches, and the high temperatures experienced by torches—requiring a significant amount of cooling, known torches are relatively bulky, especially at their distal operational end. This prevents known torches from being used effectively for cutting complex 3-D shapes, bevels, cuts, etc. That is, it is difficult to get these torches into tight areas and spaces. Moreover, the wide face of the distal ends of the torches are exposed to spatter during pierce, which damages the shield cap and accelerates its need for replacement. However, embodiments of the present invention address these issues by providing a more focused and streamlined torch shape. This is depicted in FIG. 3.

FIG. 3 depicts an exemplary plasma torch 300. The torch 300 has a torch body 305, a torch head assembly 301, a shield cap 303 and an outer retaining cap 307, where both the shield cap 303 and the outer retaining cap 307 make up the outer casing of the torch head assembly 301. The outer retaining cap 307 secures the shield cap 303 to the torch assembly (see e.g., FIG. 4). However, unlike known torches, the geometry of the some of the components of the torch 300 are optimized to allow for more versatile usage of the torch 300 as well as increase the usable life of torch components, such as the shield cap. That is, the torch 300 is narrower and smaller than known torches.

Specifically, in exemplary embodiments of the present invention, the height H of the torch head assembly 301 from its distal end 311 (the end face of the shield cap 303) to the upstream end 304 of the outer retaining cap 307 is less than 3.25 inches, and in some embodiments is in the range of 3.2 to 3 inches. Further, the outer retaining cap 307 has a maximum outer diameter W of less than 2 inches, and in some embodiments is in the range of 2 to 1.9 inches. The maximum diameter W is found at a central portion 307' of the cap 307. The outer retaining cap 307 also has a stepped down outer diameter W' which is less than the outer diameter W. This stepped down diameter W' is the maximum diameter of a cylindrical downstream portion 307" of the cap 307 where the downstream cylindrical portion 307" is the next adjacent cylindrical portion of the cap 307 in a downstream direction from the portion 307" having the maximum outer diameter W of the cap 307. In exemplary embodiments of the present invention, the ratio of the stepped down outer diameter W' to the maximum outer diameter W is in the range of 0.92 to 0.95. The cap 307 is also configured such that the ratio of the height H' to H is in the range of 0.51 to 0.55, where the height H' is the maximum distance from the distal face 311 to the upper end 306 of the downstream cylindrical portion 307".

The shield cap 303 is designed such that the shield cap has an exposed shield height SH which is larger than known torches. That is, in exemplary embodiments the shield cap 303 has an end face 311 diameter D and a shield height SH such that the ratio between the diameter D and the shield height SH is in the range of 0.25 to 0.35, where the diameter D is the diameter of the circular flat surface of the end face 311 and the shield height SH is the exposed vertical height of the shield cap 303, as measured from the end face 311 to the downstream or distal end 308 of the outer retaining cap 307. In further exemplary embodiments, the ratio of D to SH is in the range of 0.28 to 0.32. Further, the shield cap has an outer angular or conical surface 312, where the angle B between the conical surface and a horizontal is in the range of 50 to 65 degrees. In further exemplary embodiments, the angle B is in the range of 55 to 60 degrees. Additionally the angle A, as shown in FIG. 3, is in the range of 80 to 50 degrees. In further exemplary embodiments, the angle A is in the range of 70 to 60 degrees. The angle A is measured between opposite sides of the angular surface 312 of the shield cap 303 (i.e., sides that are 180 degrees from each other).

The above dimensional relationships diverge from known torch configurations and allow torches of the present invention to be used, more easily in complex 3-D and bevel cutting applications. Moreover, in exemplary embodiments, the dimensional relationships referenced above can be achieved due to, at least in part, the use of exemplary nozzles such as the nozzle 200 discussed above. That is, exemplary embodiments of the nozzles, and other torch components, discussed herein allow for the manufacture of a narrower torch. For example, the use of the cooling channels 227 can allow the internal channels and gaps of the torch to be smaller, allowing for a tighter torch configuration. Further, exemplary embodiments discussed herein allow for this more narrow and compact torch design, which enhances the ability to cut complex and beveled shapes, as well as extending the life of the torch and its components.

The torch 300 and torch components herein, such as the nozzle 200, can be used with any known cutting currents. That is, exemplary embodiments of the present invention can be used with torches which operate with a cutting current higher than 100 amps. In other embodiments, the torches are used with a cutting current in the range of 100 to 400 amps, while in further embodiments exemplary torches can be used with cutting currents higher than 400 amps.

Figure 4:
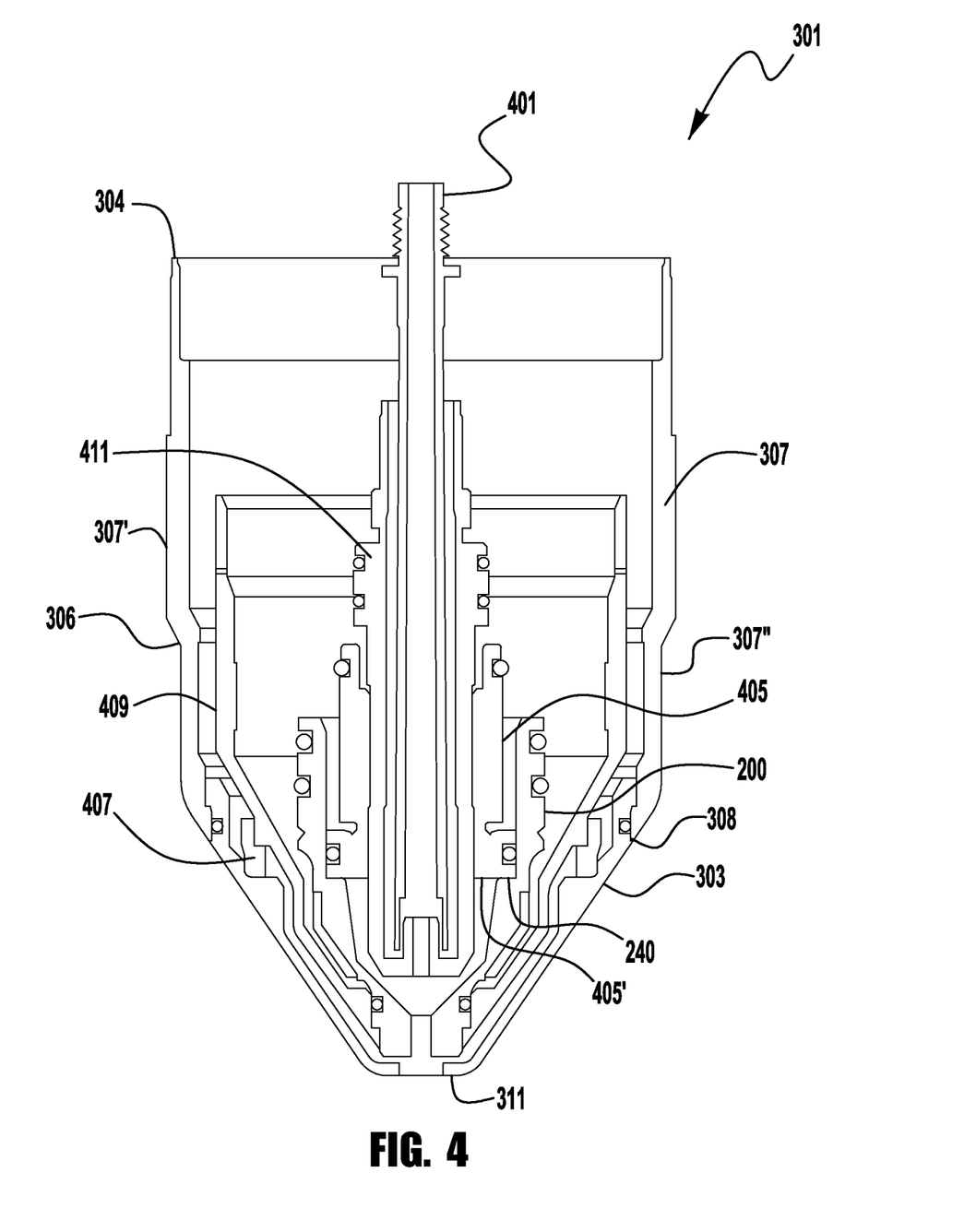
FIG. 4 is a diagrammatical representation of a cross-section of an exemplary assembly of torch head components of the present invention.

FIG. 4 depicts a cross-section of an exemplary torch head 301 of the present invention. As explained above, the torch head 301 has a shield cap 303, which is held in position by an outer retaining cap 307. Internal to the shield cap 303 is the nozzle 200 which is held into position with an inner retaining cap 409. Between the inner retaining cap 409 and the shield cap 303 is a shield gas swirler 407 which channels and imparts a flow on the shield gas being directed between the inner retainer cap 409 and the shield cap 303. (A more detailed discussion of the swirler 407 and cap 409 is set forth below). Upstream of the nozzle 200 is the electrode 411 and cooling tube 401, both of which collectively are inserted into the cavity of the nozzle 200, as discussed previously. The plasma arc is generated from the electrode 411 and the cooling tube 401 is used to direct a cooling fluid to the electrode 411 to keep it at an acceptable operating temperature. Between the electrode 411 and the nozzle 200 is a plasma gas swirl ring 405 which imparts a swirl flow on the plasma gas that aids in maintaining a stable arc during cutting and to cool the nozzle 200. The plasma gas swirl ring 405 has a distal end surface 405' which seats on an inner seating surface 240 of the nozzle 200.

Figure 5:
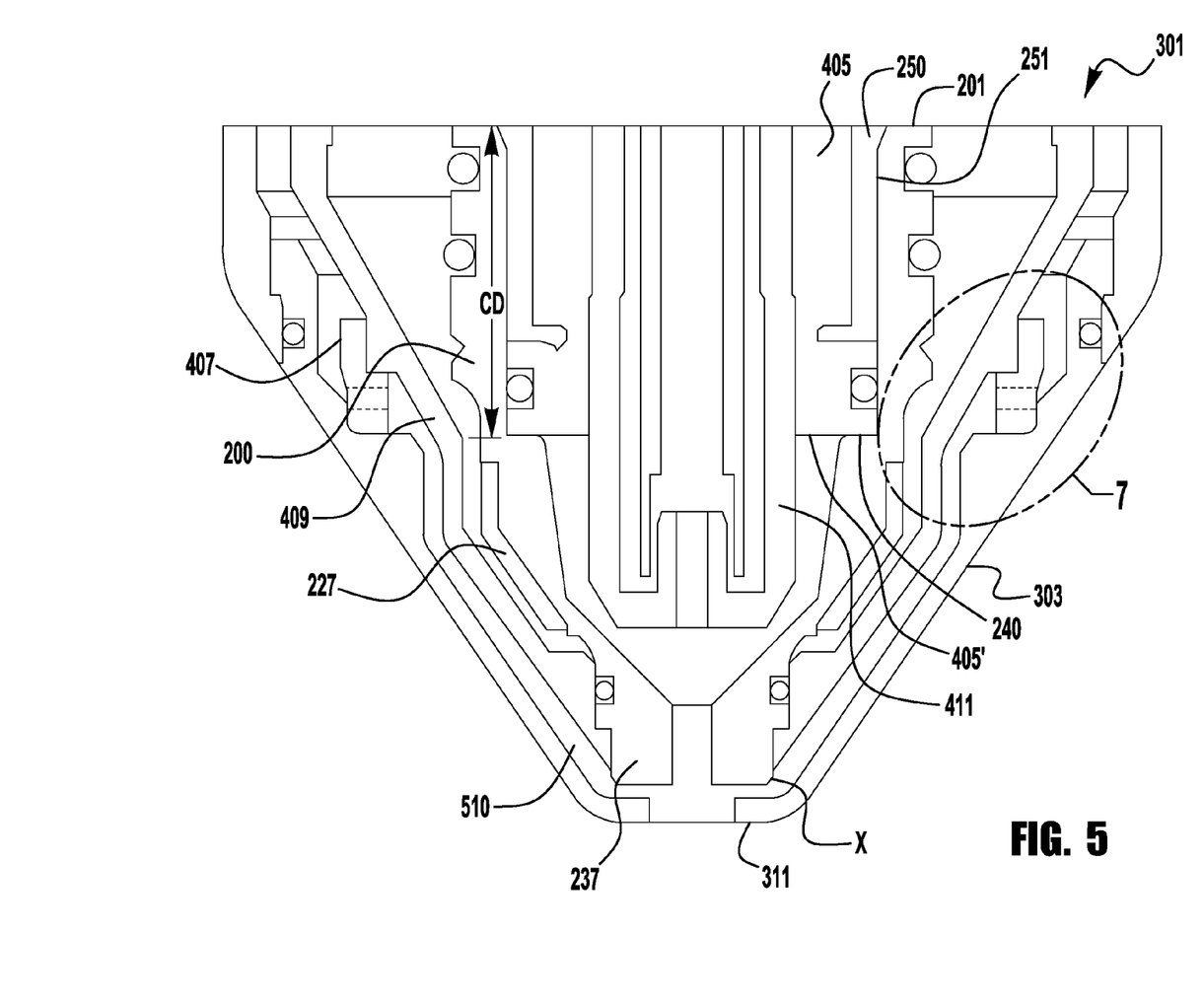
FIG. 5 is a diagrammatical representation of a closer view of the cross-section of FIG. 4.

FIG. 5 depicts a closer view of the cross-section of the torch head 301. As can be seen, and as discussed above, the distal cooling portion 237 of the nozzle 200 extends past the distal end of the inner retaining cap 409 by a distance X, and has a length L which increases its heat transfer surface area. This increases the cooling of the end of the nozzle 200 and increases the life of the nozzle.

Further, as shown and discussed previously, the plasma gas swirl ring 405 is inserted into the nozzle 200. Specifically, the nozzle 200 has a swirl ring cavity 250 formed by a cylindrically shaped cavity wall 251. The cavity 250 also has a horizontal seating surface 240 onto which a distal end surface 405' of the plasma swirl ring 405 is seated. In exemplary embodiments of the present invention the surface 240 is positioned such that the nozzle 200 has a swirl ring cavity 250 depth CD (between the surface 240 and the upstream end 201) in the range of 0.35 to 0.75 inches. In further exemplary embodiments, the depth CD is in the range of 0.62 to 0.72 inches. Further, in exemplary embodiments, the cavity depth CD is in the range of 40 to 60% of the overall length (from surface 201 to surface 233) of the nozzle 200. In such embodiments, the swirl ring 405 is positioned deeper into the nozzle 200 than known torches. This allows the swirl ring 405 and nozzle 200 of embodiments of the present invention to provide the desired plasma gas flow to provide a stable plasma jet during cutting, especially, in torches with the geometries and dimensional relationships discussed above.

Figure 6A:
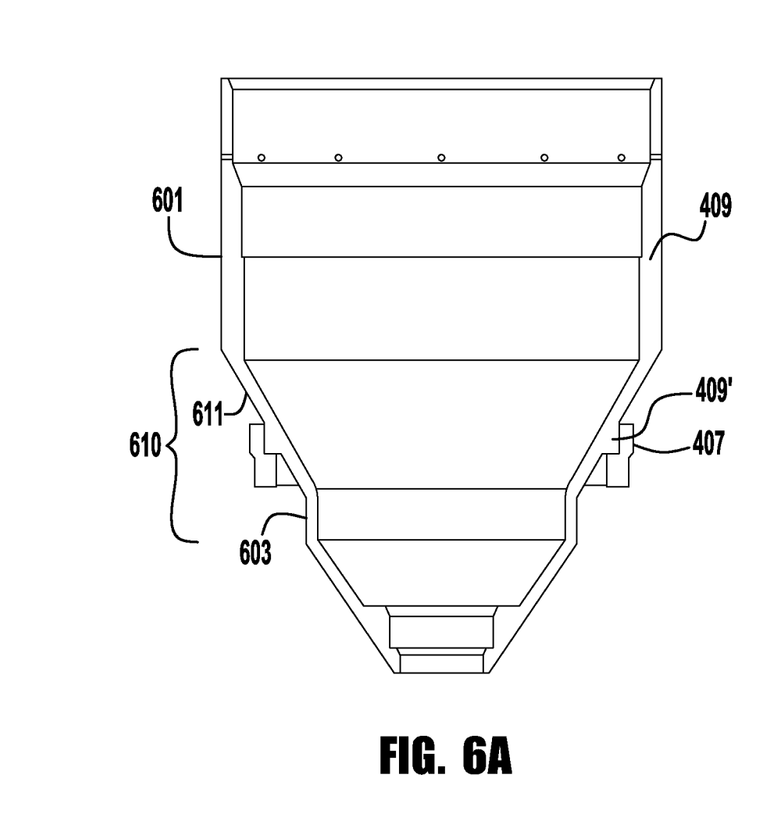
FIGS. 6A and 6B are a diamgrammatical representation of an exemplary embodiment of an inner retainer assembly of the present invention.
Figure 6B:
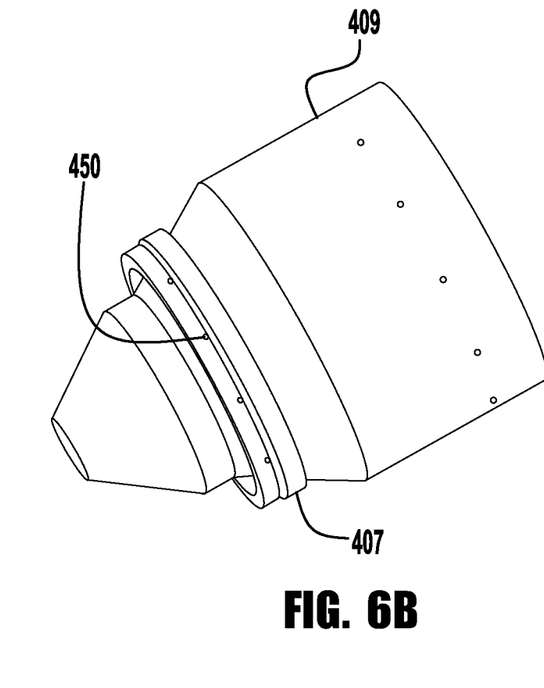

Turning now to FIGS. 6A and 6B, an exemplary embodiment of an inner retaining cap assembly of the present invention is shown. The inner retaining cap assembly is comprised of the inner retaining cap 409 and the shield gas swirler 407. As shown, the retaining cap 409 has an internal cavity into which the nozzle, electrode and swirl ring are inserted (see, e.g., FIGS. 4 and 5). Additionally, as shown, the cap 409 has a main portion 601 which is cylindrically shaped and has the largest external diameter of the cap 409. Downstream of the main portion 601 is a transition portion 610, which has a conical, or angled outer surface 611, and which transitions the outer surface of the cap 409 from the main portion 601 to a cylindrical portion 603 which has a smaller outer diameter than the main portion 601. This transition portion 610 changes the outer diameter of the cap 409 such that the cap 409 can be accommodated in the narrow torch configuration discussed above. Also, as shown, the transition portion 610 comprises a swirler engagement portion 409' which engages with the swirler 407. In the exemplary embodiment shown, the swirler engagement portion 409' extends outward from the surface 611 of the transition portion 610.

As stated above, the swirler 407 is engaged to the cap 409 via the engagement portion 409', which aids in securing the swirler 407 between the cap 409 and the shield cap 303. The swirler 407 also acts as an isolator between the cap 409 and the shield cap 303. Thus, in exemplary embodiments the swirler 407 is made from a high heat resistant non-metallic material. The swirler 407 is generally ring shaped such that the cap 409 passes through the center of the ring. Additionally, the swirler 407 has a plurality of flow channels 450 which pass from an outer diameter of the swirler 407 to an inner diameter of the swirler 407. These channels 450 allow the shield gas to flow from upstream of the swirler 407 to the shield gas channel 510 downstream of the swirler 407. This is generally depicted in FIG. 7.

Figure 7:
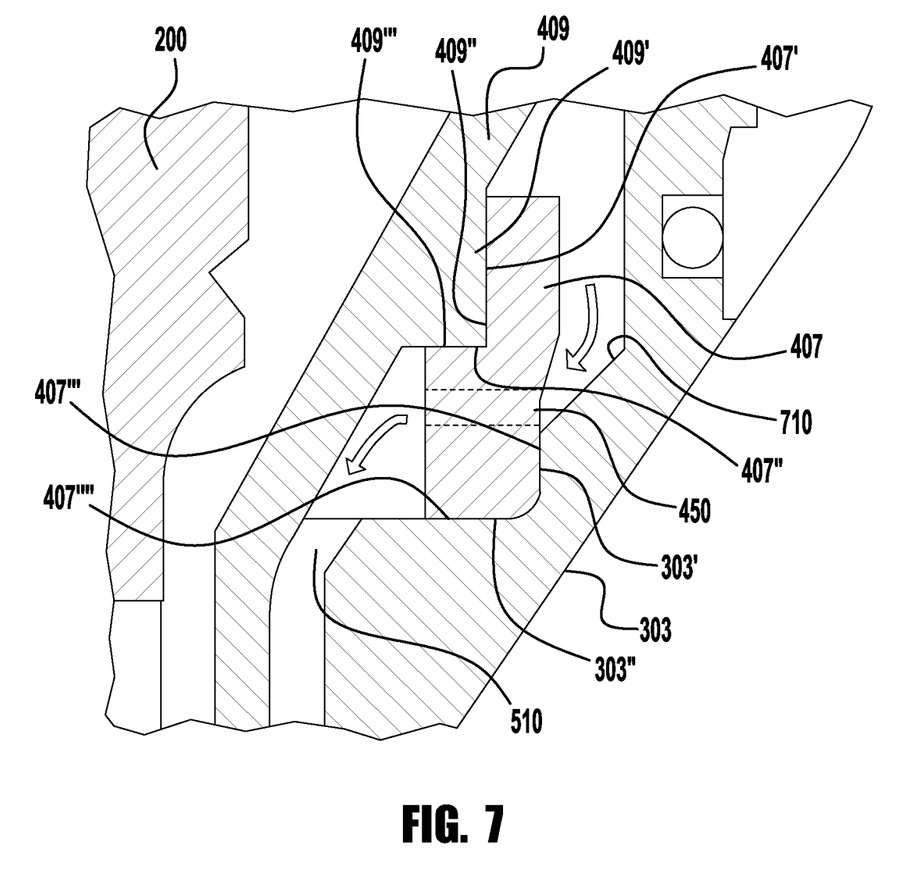
FIG. 7 is a diagrammatical representation of a cross-section of a portion of an exemplary embodiment of the present invention.

As shown in FIG. 7, the swirler 407 has an inner radial profile, which is comprised of the surfaces 407', 407" and the vertical surface below 407". The vertical surface below 407" is innermost radial surface of the swirler 407 and, as shown, does not make contact with the surface 611 of the transition portion 610 of the cap 409. As shown, the channels 450 pass from an outer radial profile of the swirler 407 to the inner radial profile and exit through the inner surface which does not make contact with the surface 611. Thus, the channels 450 allow for shield gas flow into the channel 510. That is, as shield gas contacts the outer radial profile of the swirler 407 it passes through the channels 450 and exits into the channel 510. FIG. 7 also depicts the swirler 407 secured between a protruding engagement portion 409' of the inner retainer cap 409 and the shield cap 303. The engagement portion 409' protrudes from the outer surface of the inner retainer cap 409. Specifically, in the exemplary embodiment, the engagement portion 409' has at least two engagement surfaces 409" and 409'", which engage with two corresponding engagement surfaces 407' and 407", respectively, on the swirler 407. This engagement provides both horizontal and vertical support for the swirler 407. Additionally, in exemplary embodiments, an outer surface 407''' and distal end surface 407'''' of the swirler 407 engage, respectively, with surfaces 303' and 303'' on the inner surface of the shield cap 303. The shield cap retaining surfaces 303' and 303'' form a recessed engagement portion in an inner surface 710 of the shield cap 303 to aid in securing the swirler 407, and again restrains the swirler 407 in both a horizontal and vertical direction. As the shield gas flows from its upstream source it is directed to the channels 450 and the channels direct the flow into the shield gas channel 510. In the embodiment shown in FIG. 7, the channels 450 are oriented horizontally, such that their respective centerlines are perpendicular relative to the centerline CL of the torch. However, in other exemplary embodiments, the channels 450 can be angled such that their respective entrances (from a shield gas flow perspective) is positioned further from the distal end of the torch and end of the cap 409, then the respective shield gas exits of the channels 450. That is, in using FIG. 7 as a reference the channel 450 would slope downward from right to left, where the entrance to the channel 450 (in the outer profile of the swirler 407) would be higher than the exit of the orifice (in the inner profile of the swirler 450). Thus, in such embodiments, the channels 450 such that their exits are closer to the distal end of the cap 409. In exemplary embodiments, the channels 450 have a circular cross-section and have a diameter which allows for the desired amount of air flow. In other exemplary embodiments, the cross-section of the channels 450 can be non-circular. In exemplary embodiments, as shown in FIG. 7, the entrance to the channels 450 is positioned on the same surface of the engagement surface 303'. In some embodiments, the diameters or cross-sections of the channels 450 can all be the same, whereas in other embodiments the diameters or cross-sections of the channels 450 can be different. For example, there can be embodiments where some channels have a first diameter, and other channels 450 have a second smaller or bigger diameter.

Figure 8:
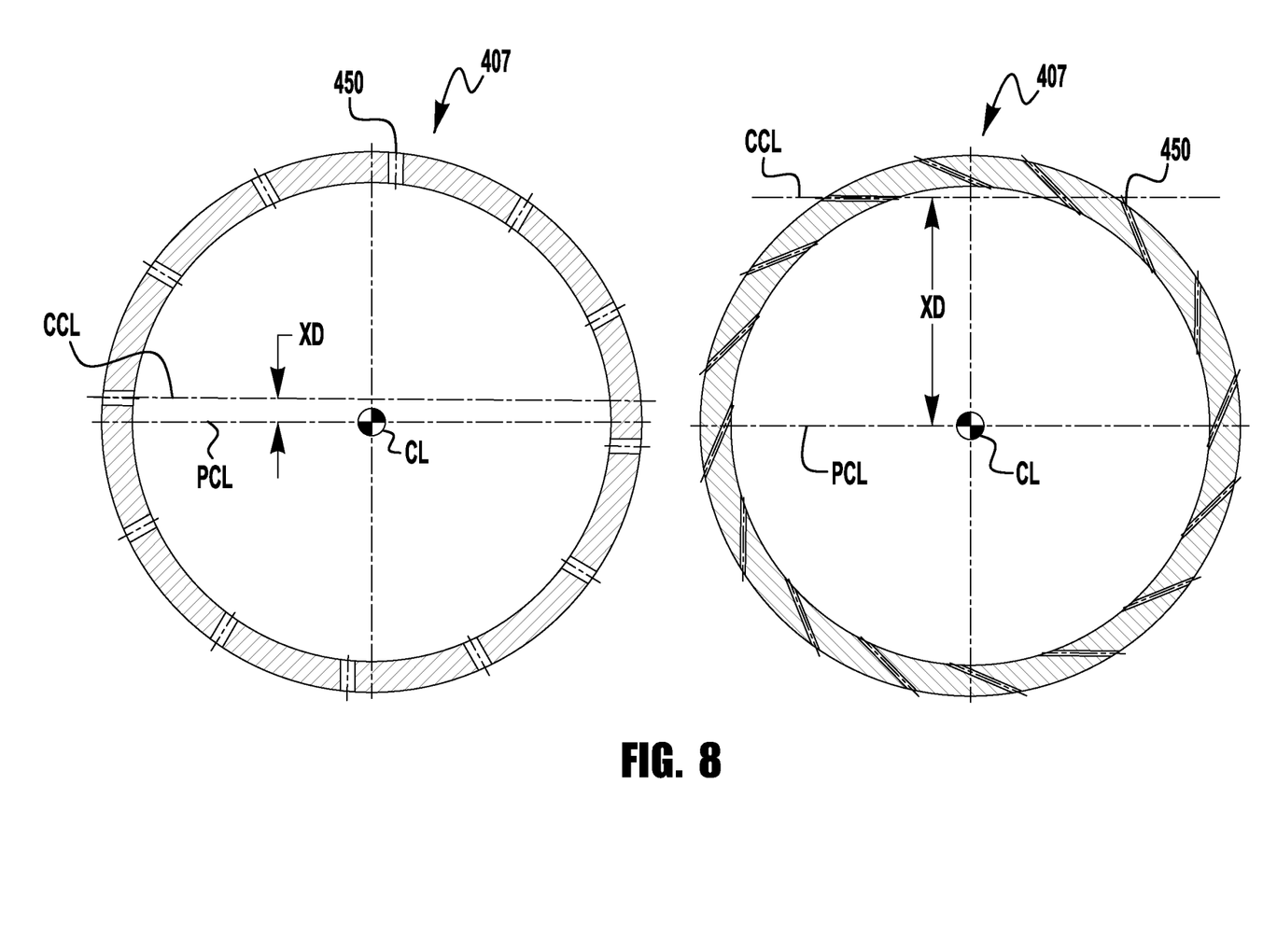
FIG. 8 is a diagrammatical representation of an exemplary embodiment of an isolator ring of the present invention.

FIG. 8 depicts a cross-sectional view of two alternative embodiments of the swirler 407. As shown, the channels 450 are distributed radially and evenly around the circumference of the swirler 407. The number of channels should be sufficient to provide the desired flow of shield gas to the channel 510 and for the cutting operation. In exemplary embodiments, the number of channels ranges between 10 and 20. Further, the channels 450 are oriented in the swirler 407 so as to impart a swirl flow to the shield gas such that the shield gas is swirling in the channel 510. This aids in providing a shield gas which aids in stabilizing the plasma arc during a cutting operation. As shown, in exemplary embodiments the channels 450 are oriented such that their respective centerlines CCL are offset by a distance XD from a line PCL parallel to the centerline CCL that passes through the centerpoint of the swirler CL. As shown in FIG. 8, the swirler 407 on the left has an offset XD which is less than that of the swirler 407 on the right. The larger the offset XD the larger the amount of swirl imparted to the shield gas flow. In the embodiments shown each of the channels have the same offset XD. However, in other exemplary embodiments some of the channels have a first offset XD, while others of the channels 450 have a second offset XD, which is different. That is, in exemplary embodiments, the offset XD of the respective channels 450 is optimized to provide the desired swirl flow for the shield gas. In exemplary embodiments of the present invention the offset distance XD is in the range of 0.03 to 0.86 inches. In further exemplary embodiments, the offset distance XD is in the range of 0.054 to 0.57 inches.

By incorporating features and attributes described above, exemplary torches described herein are able to have an significantly optimized profile and geometry (e.g., as described relative to FIG. 3) and, therefore, provide an optimized cutting torch that has improved life and cutting attributes. This improvement over known technologies is achievable due to novel improvements discussed herein, as without such novel features the enhancements herein could not be obtained. Thus, exemplary embodiments described herein represent a significant improvement over known torch configurations, and provide improved performance, durability and versatility as compared to known torches.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A plasma torch nozzle retaining cap assembly, comprising:
    an inner retaining cap, said cap comprising:
        a cylindrically shaped main portion which has a maximum outer diameter which is the maximum outer diameter of said inner retaining cap; and
        an angular transition portion coupled to said main portion which couples said cylindrical shaped main portion to a second cylindrical portion having an outer diameter which is smaller than said maximum outer diameter, said angular transition portion comprising a swirler engagement portion coupled to an outer surface of said angular transition portion; and
    a swirler having a ring shape with an inner diameter profile and an outer diameter profile and a radial center, where said inner diameter profile engages with said engagement portion and has at least one inner surface which does not make contact with said angular transition portion,
    wherein said swirler comprises a plurality of radially distributed channels, where each of said channels has an entrance in said outer diameter profile and an exit in said at least one inner surface, and
    wherein at least some of said channels are oriented such that a centerline of each of said at least some channels are offset from lines parallel to each of said centerlines, respectively, which pass through the radial center of said swirler by an offset distance.

2. The plasma torch nozzle retaining cap assembly of claim 1, wherein all of said plurality of channels are offset by said offset distance.

3. The plasma torch nozzle retaining cap assembly of claim 1, wherein all of said channels have a cylindrical shape.

4. The plasma torch nozzle retaining cap assembly of claim 1, wherein said swirler is made from a dielectric material.

5. The plasma torch nozzle retaining cap assembly of claim 1, wherein the number of said plurality of channels is in the range of 10 to 20.

6. The plasma torch nozzle retaining cap assembly of claim 1, wherein said offset distance is in the range of 0.03 to 0.86 inches.

7. The plasma torch nozzle retaining cap assembly of claim 1, wherein said offset distance is in the range of 0.054 to 0.57 inches.

8. The plasma torch nozzle retaining cap assembly of claim 1, wherein at least some other of said plurality of channels are offset by a distance different than that of said at least some of said channels.

9. The plasma torch nozzle retaining cap assembly of claim 1, wherein at least some of said plurality of channels are angled such that the exit of each of said angled channels is closer to a distal end of said inner retaining cap, respectively.

10. The plasma torch nozzle retaining cap assembly of claim 1, wherein at least some of said channels have a different diameter than others of said channels.

11. A plasma cutting torch assembly, comprising:
a plasma torch nozzle retaining cap assembly, comprising:
an inner retaining cap, said cap comprising:
a cylindrically shaped main portion which has a maximum outer diameter which is the maximum outer diameter of said inner retaining cap; and
an angular transition portion coupled to said main portion which couples said cylindrical shaped main portion to a second cylindrical portion having an outer diameter which is smaller than said maximum outer diameter, said angular transition portion comprising a swirler engagement portion coupled to an outer surface of said angular transition portion; and
a swirler having a ring shape with an inner diameter profile and an outer diameter profile and a radial center, where said inner diameter profile engages with said engagement portion and has at least one inner surface which does not make contact with said angular transition portion,
wherein said swirler comprises a plurality of radially distributed channels, where each of said channels has an entrance in said outer diameter profile and an exit in said at least one inner surface, and
wherein at least some of said channels are oriented such that a centerline of each of said at least some channels are offset from lines parallel to each of said centerlines, respectively, which pass through the radial center of said swirler by an offset distance; and
a shield cap which engages with said outer diameter profile of said swirler.

12. A plasma torch nozzle retaining cap assembly, comprising:
a swirler having a ring shape with an inner diameter profile and an outer diameter profile and a radial center,
wherein said swirler comprises a plurality of radially distributed channels, where each of said channels has an entrance in said outer diameter profile, and
wherein at least some of said channels are oriented such that a centerline of each of said at least some channels are offset from lines parallel to each of said centerlines, respectively, which pass through the radial center of said swirler by an offset distance.

13. The plasma torch nozzle retaining cap assembly of claim 12, wherein all of said plurality of channels are offset by said offset distance.

14. The plasma torch nozzle retaining cap assembly of claim 12, wherein all of said channels have a cylindrical shape.

15. The plasma torch nozzle retaining cap assembly of claim 12, wherein said swirler is made from a dielectric material.

16. The plasma torch nozzle retaining cap assembly of claim 12, wherein the number of said plurality of channels is in the range of 10 to 20.

17. The plasma torch nozzle retaining cap assembly of claim 12, wherein said offset distance is in the range of 0.03 to 0.86 inches.

18. The plasma torch nozzle retaining cap assembly of claim 12, wherein said offset distance is in the range of 0.054 to 0.57 inches.

19. The plasma torch nozzle retaining cap assembly of claim 12, wherein at least some other of said plurality of channels are offset by an offset distance different than that of said at least some of said channels.

20. The plasma torch nozzle retaining cap assembly of claim 12, further comprising an inner retaining cap having an angular transition portion, wherein said angular transition portion includes a swirler engagement portion coupled to an outer surface of said angular transition portion, and wherein said inner diameter profile of said swirler engages with said swirler engagement portion and has at least one inner surface which does not make contact with said angular transition portion.

* * * * *